May 12, 1964

E. O. SCHWEITZER 3,132,472

THERMAL ACTUATOR

Filed Sept. 8, 1959

INVENTOR.
EARL O. SCHWEITZER
BY
ATTORNEYS

May 12, 1964   E. O. SCHWEITZER   3,132,472
THERMAL ACTUATOR
Filed Sept. 8, 1959   3 Sheets-Sheet 3

INVENTOR.
EARL O. SCHWEITZER
BY
ATTORNEYS

United States Patent Office 3,132,472
Patented May 12, 1964

3,132,472
THERMAL ACTUATOR
Earl O. Schweitzer, Wickliffe, Ohio, assignor, by mesne assignments, to Crane Co., Chicago, Ill., a corporation of Illinois
Filed Sept. 8, 1959, Ser. No. 838,746
21 Claims. (Cl. 60—23)

This invention relates to the art of force multiplication, as in heat fluid motors, thermal amplifiers and actuators and power relays and, more particularly, to methods of and means for creating, controlling and modifying large working forces, or forces and motions, in fine response to and/or in a determinable relation to variable, relatively small forces or signals.

A problem solved by my invention is that of providing and controlling a large force, sufficient for example to operate a big valve, in response to a small force, such as is available from the output of an electronic controller as disclosed in U.S. Patent No. 2,759,129. A more specific problem to which my invention is addressed in solution is that of providing a reliable, sensitive, stable, economical actuator, instrumentality or motor which is quickly and accurately responsive to minute forces and/or minute electrical signals, free from the adverse influence of ambient conditions through a wide range thereof, and quite adapted to remote control and efficient operation remote from the point of signal generation or occurrence.

Heretofore the art has turned largely to electrohydraulic, electro-mechanical and electro-pneumatic actuators and transducers characterized by relatively complicated and expensive mechanisms, motors, pumps, gear trains, valves, filters, relays and electrical amplifiers, all presenting expensive problems of wear, maintenance, failure, replacement and repair as well as high initial cost.

It is among the objects of my invention to solve such problems as these and provide a heat-power actuator or heat fluid motor with an improved vapor generator for exerting great working forces in response to small signal forces with accuracy and quick responsiveness to the signal and to changes in the signal. Another object is to provide a force multiplying actuator with feedback capable of delivering desirable proportional responses to particular determinable signals regardless of uncontrollable variables and ambient conditions tending to affect the desired responses adversely.

Another object is to provide a heat power actuator or heat fluid motor capable of high force multiplication and operation independently of the rate of heat input into the motor and able to gain great changes in fluid pressure and volume in a large body of actuating fluid with relatively small changes in the temperature or gross heat content of the main body of fluid.

Another object is to avoid heat-lag in a liquid-vapor generator useful in a heat fluid motor, or the like, as by applying heat to no more than a small fraction of the mass of the liquid contained in the generator and using an efficient condenser for rapid heat dissipation to effect rapid changes in desirable actuating pressures. It is thus also an object of my invention to eliminate or substantially eliminate hunting in a heat fluid motor and thermal actuator.

Another object is to effect great changes in pressure and volume of fluid in a heat fluid motor by controlling merely the gravity induced flow of lighter and hotter portions of the fluid, relative to the denser and cooler portions. A further object is to employ the latent heat of vaporization of a fraction of the fluid in a heat fluid motor, and the addition and subtraction of such latent heat to and from such a part of the fluid, to effect rapid and easily controlled changes in the fluid pressure and volume in such a motor. A more specific object is to provide in a heat fluid motor a substantially constant continuous conversion of liquid to vapor in a hot part of the motor and the substantially continuous conversion of vapor to liquid in a cold part of the motor and to effect great and rapid changes of pressure and volume of all the fluid in the motor by varying the rate of vapor condensation.

A further object is to effect great changes in pressure and volume of the fluid in a heat fluid motor by the employment of a small force to control merely the gravity induced flow of vapor from a boiler part of the motor to a condenser part, both at the same fluid pressure, and in conjunction with this object to provide a vapor generator in the boiler part of a high rate of evaporation heating only a minimum quantity of liquid.

Another object is to produce a thermal actuator of high thermo-dynamic efficiency which will produce large power output relative to small power input, all in simple, reliable and economical form.

Another and more specific object of my invention is to provide a heater for a liquid-vapor generator in the liquid closely adjacent the surface of the liquid. Another object is to create vapor under pressure by boiling liquid only at and near the evaporation surface thereof.

Another object is to provide a desirable, reliable and economical method of force and power multiplication. A particular object is to provide a method of converting and multiplying a small electrical signal into large mechanical force and motion. Another object is to provide a method of force multiplication with constant heat input by variable heat output.

These and other objects and advantages of my invention will appear from the following description of a preferred and other forms and embodiments and practices thereof, reference being had to the accompanying drawings in which.

Figure 1:
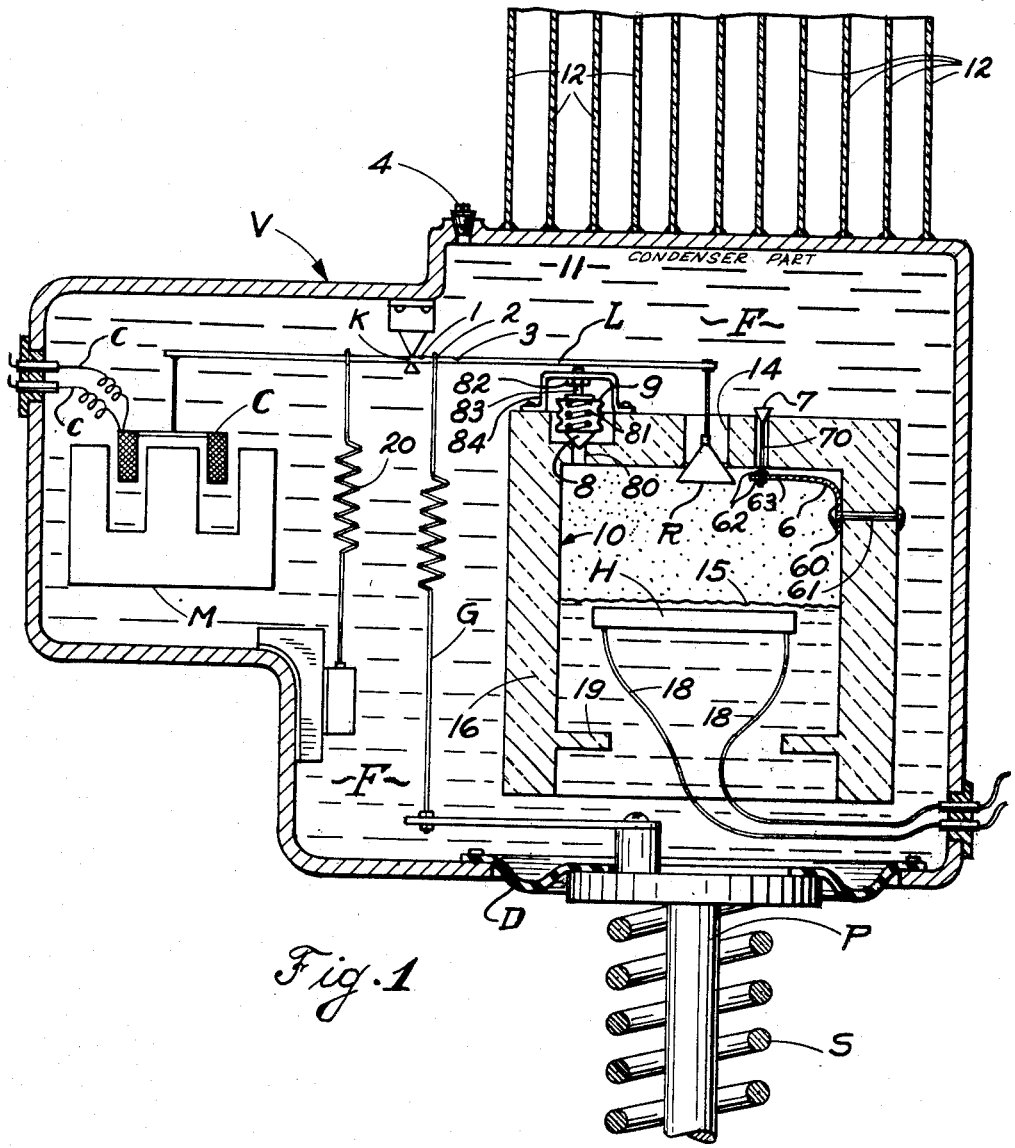
FIGURE 1 is a partially diagrammatic and partly fragmentary, vertical, longitudinal, sectional view showing the essential working parts and constituents of a preferred form of my thermal actuator and heat fluid motor.
Figure 2:
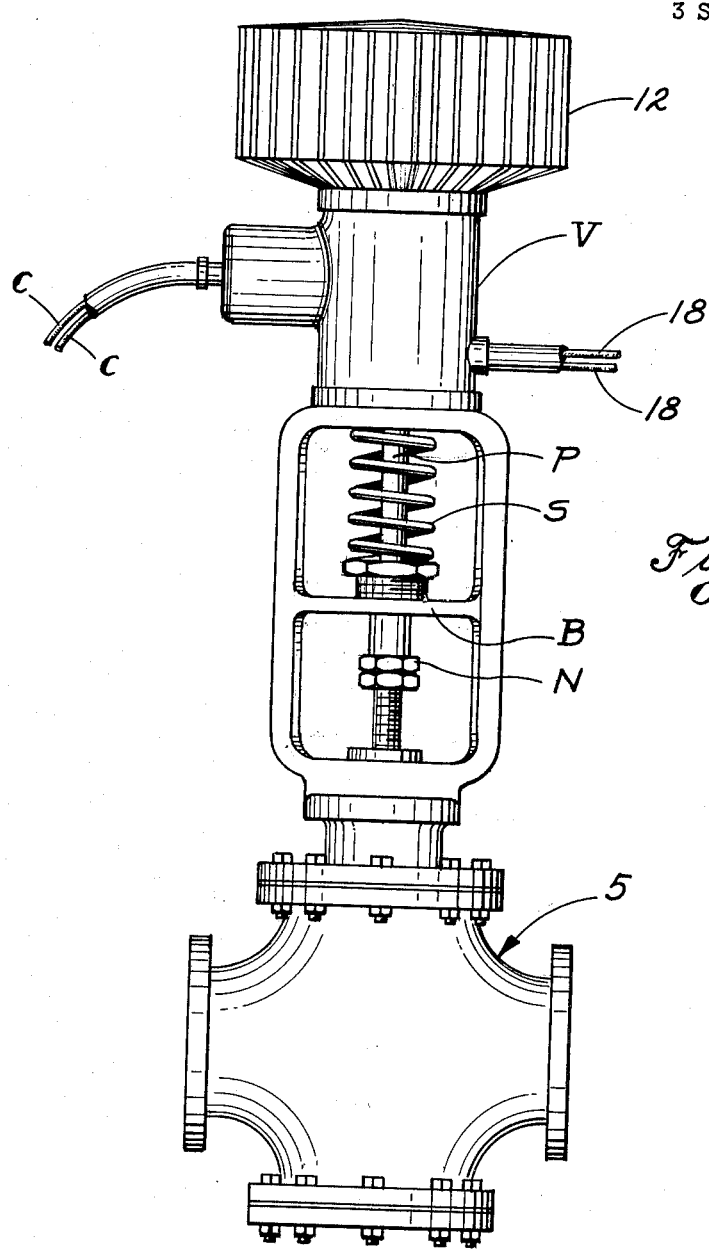
FIGURE 2 is a side elevation of my actuator attached to and combined with a valve positioned and controlled by my actuator.

As illustrated somewhat diagrammatically in FIGURE 1 a preferred form of my invention comprises a fluid-tight pressure vessel V containing a vaporizable fluid F which when boiled and expanded under the influence of heat from the heater H and under the control of the vapor and heat release valve R tends to raise the fluid pressure in the vessel and move a movable wall or part thereof, such as the flexible diaphragm D, along with the working piston P against the resistance of a retractor spring S, to exert the desired force and motion on an external instrumentality. The piston P comprises the transmitter of the large force and motion provided by my invention viewed as a heat fluid motor and may take the form of the valve stem of an actuated or controlled valve 5, FIGURE 2, conveniently called the process valve since my invention has frequent utility in controlling large valves employed in refineries and other industrial and chemical processes. On the other hand, the vapor and heat release valve R is responsive to the small force or signal, the multiplication of which into the great force exerted by the piston P is one of the objects of my invention. In this form of my invention the small force or signal may comprise a small electric current, or a small increment thereof, flowing through the movable coil C disposed in the field of the magnet M; the coil being connected mechanically to the valve R through the lever L fulcrumed at K, and connected electrically to the source of the signal through flexible leads c passing, fluid-tight, through the wall of the vessel. Feedback between the piston P and the lever L through the yielding spring feedback G relates the current in the coil C to a proportionate position of the piston. And this relationship may be conveniently selected and adjusted by choosing the points of connection between the lever L and the feedback G relative to the fulcrum K as at 1, 2 or 3.

The vessel V comprises and/or contains a boiler or boiler part 10 embracing the heater H and part of the fluid F and, above the boiler, a condenser or condenser part 11 distinguished or suggested by heat radiating fins 12 attached to the exterior of the top of the vessel. The boiler at and through its open bottom 13 freely communicates with the rest of the interior of the vessel V, but has only restricted communication therewith at and through its upper portion via the orifice 14 which is controlled by the valve R. The fluid F may desirably be a liquid that boils a little above the highest contemplated ambient temperature and melts below the lowest contemplated ambient temperature at atmospheric pressure. I have employed fluorinated hydrocarbon compounds such as the well known Freons, separately and in various mixtures but presently prefer perchlorethylene, also known as tetrachloroethylene, as the essential ingredient of the fluid F so that the fluid will melt at about −19° C. and boil at about 120° C. When the vessel V is cool and full of fluid F in the liquid state, the piston will have risen to its greatest height (higher than suggested in FIG. 1), compressing the fluid F, or tending to compress it by the spring S if the piston has no stop other than the liquid in the vessel to limit its upward travel.

As a practical matter, I prefer that the upward motion of the piston P as viewed, have a positive mechanical stop to limit its upward travel. For illustration the cross bar B in the valve cage, FIG. 2, may coact with the nuts N on the piston rod and/or stem of the valve 5 to selectably limit the upward movement of the valve stem and piston. When in such position the piston rod is in its upper "seated" position. We may assume that the valve 5 is closed by positive seating engagement by downward movement of the closure element of the valve 5 with the seats therein (not shown) wherewith to provide a positive limit of downward travel of the piston P, and thus provide a lower "seated" position.

A vent and filler plug 4 is preferably provided in an uppermost part of the vessel V to facilitate the filling of the vessel with the fluid F and/or the venting thereof as need may be.

In this preferred example of an embodiment of my invention the fluid F has a small, and otherwise negligible, coefficient of expansion in the liquid state, but for the purpose of filling the vessel V satisfactorily with one or more of the boilable fluids of this preferred example, my teaching is that the vessel be filled with the fluid F at a temperature higher than the highest ambient temperature in which my actuator or fluid motor is intended to operate. Were the vessel V filled with fluid F under cooler conditions, then the expansion of the liquid, even if small, would tend to impair the return of the motor to its desired "zero" position at any higher temperatures which, however, are cooler than the highest contemplated ambient temperature. Since it is probable that my actuators will be used most of the time at ambient temperatures markedly lower than the highest contemplated ambient temperature, filling the vessel with fluid F in the liquid state above the highest contemplated ambient temperature will provide a vapor cushion in the highest part of the vessel V at all ambient temperatures, such as normal room temperature, prevailing when the vessel and the fluid is "cold" and not receiving heat from the heater H.

When heat is supplied to the boiler by the heater H and fluid is begun to be boiled, fluid in the vapor state will be generated in the boiler above the liquid level 15, creating fluid pressure throughout the vessel V so long as the vapor is kept hot in the boiler and prevented from flowing out of the boiler as through the orifice 14 by the valve R. The condition suggested in FIGURE 1 is that the valve R has been constrained to its closed position while the heater has been generating vapor in the boiler sufficiently to force the liquid level 15 down to the height shown, thereby increasing the total volume of fluid in the vessel and displacing the diaphragm D and piston P downwardly against the resistance of the spring S, or against other external force to be overcome, proportionately to the downward movement of the liquid level 15. The relation of piston movement to vapor volume and pressure depends on known thermo-dynamic laws and steam tables including the differential relation between the volume of the fluid in the vapor state at the pressure required to position the piston compared to the volume thereof in the liquid state. The condition suggested in FIGURE 1 can represent a force of about 300 lbs. being exerted by the piston responding to a signal of about 5 milliamperes of current in the coil C and piston motion to a mid portion of its working stroke.

Given the condition above described and with a continuous uniform input of heat, and given the valve R continuing in its closed position, more and more of the fluid will be converted to the vapor state and greater and greater pressures will be developed in the boiler and upon the piston so long as the valve R remains closed. When, however, the condition called for by the signal in the coil C is satisfied by the force and motion sought from or for the piston, then the valve R, being also influenced by the feedback connection G will begin to open and permit an outflow of vapor from the boiler through the orifice 14 into the condenser part of the vessel adjacent the radiating fins 12 where and whence the vapor will be condensed back to liquid losing at least its latent heat to atmosphere outside of the vessel V and thus losing its vapor volume whereby to diminish, pro tanto, the condition of increasing fluid pressure in the vessel. I think of the valve R as a heat release valve because when it permits vapor bubbles to flow from the boiler, to be condensed outside of the boiler, the quantum of heat in the boiler-condenser system within the pressure vessel is reduced, and conversely, when the valve R throttles down or cuts off the flow of vapor through the orifice 14, given constant and continuous input of heat by the heater H as I prefer, the quantum of heat contained within the system is increased. It follows by the laws of thermo dynamics that the pressure of the fluid in the vessel is a direct and determinable function of the total quantity of heat therein so that my control of the heat quantum by the heat release valve R correspondingly controls the pressure of the fluid in the vessel which is exerted upon the piston P and made available for useful work.

In the form of my invention shown in FIGURE 1 it will now appear that the small force required to move the valve R is merely that force corresponding to the static head of the liquid between the liquid level 15 and the seat of the valve in the orifice 14. This static head may in ordinary practice, with decent regard to the proportioning of the parts in relation to the work and motion required of the piston P, amount to little more than a few inches of liquid, a minute force compared with the pressure that can be developed in the vessel and exerted upon the piston. Giving the valve R a balanced form rather than the simple, unbalanced, conical form suggested diagrammatically in FIGURE 1, the force required to move the valve can be reduced to a nominally small amount, and the relation between the signal force required to move the valve and the total force available to move the piston tends to reflect a large and satisfactory force multiplication or gain. In a working embodiment of my invention a gain of about 250,000 to 1 is a practicable possibility. To get the advantage of feedback requires a considerable reduction of this potential gain but leaves a great, useful and surprising multiplication.

Still referring to FIGURE 1 it will have been noted that the functioning of my invention employs heat difference between the boiler part 10 and the condenser part 11 of the vessel V, i.e., from the hot to the cool or cold parts of the system, and, therefore, the efficiency of my actuator is increased by insulating the boiler from the condenser to enhance the steepness of the thermal gradient or difference therebetween. In this preferred form of my invention the boiler 10 may take the form of a diving bell or inverted open cup with thick heat-insulating side and top walls 16 provided to keep as far as practicable all of the heat in the system within the boiler and more particularly within the upper part of the boiler above the liquid level thereof where the vapor with its latent heat of vaporization is confined. Conversely, it is my desire to keep all of the liquid in the lower part of the boiler as well as all of the liquid throughout the vessel V and the condenser part 11 thereof as cool as the ambient temperature of the atmosphere outside of the vessel and/or only as slightly elevated above that temperature as may be incident to the movement and condensation of vapor bubbles from the orifice 14 to and/or through the condenser part 11 of the vessel.

Augmenting these purposes and accomplishments, I prefer to dispose and retain the heating element 21 of the heater H in close and continuous proximity to the level of the liquid 15 within the boiler as by giving the heater a buoyancy such that it will float at the liquid level with the heating element 21 thereof immersed just below and as near as practicable to the surface of the liquid, see also FIGURE 3. Ample and supple electrical leads 18 may pierce the vessel V, fluid-tight, and be connected to the heater H to provide energy for the heater and permit the heater to rise and fall freely with the liquid level between all the extreme conditions of liquid level contemplated during use of the boiler. A perforate abutment 19 may be provided within a lower part of the boiler 10 to arrest downward movement of the heater should the liquid level 15 tend to fall therebelow whence the suspension of the heating element just at or above the liquid level rather than just below it would radically reduce the relation of heat input to vapor generation and tend to preserve the vessel and boiler against excessive pressure if the valve R should fail to open or some other unforeseen condition impair the intended limitation on vapor generation.

Still referring to FIGURE 1, I also provide a zero adjusting spring 20 accessible by means without the vessel, not shown in FIGURE 1, to relate the "zero" position of the valve R to the "zero" relation that is desired between the current in coil C and the pressure in the vessel.

In FIGURE 1 I have also disclosed and suggested additional means for releasing vapor or hot expanded fluid from the boiler 10 whenever the temperature of the fluid therein and/or the pressure of the fluid throughout the vessel V exceeds one or variously selected predetermined limits or amounts. One of the instrumentalities for this purpose may comprise a bimetallic thermal responsive element 6 operatively connected to a release valve 7 controlling flow through the hole 70 whereby to open the valve in direct response to a high preselected temperature; the same reflecting a corresponding pressure in the boiler and in the vessel depending on the nature of the fluid, its entropy, etc. The other instrumentality is directly and adjustably responsive to the pressure of the fluid in the vessel V and may comprise a valve 8 actuated by spring expanded bellows 9 that will collapse at adjustably selected external pressures whereby to open the valve when the pressure in the vessel exceeds any predetermined selected value. The bimetallic element 6 may have one end 60 fixedly secured to the wall of the boiler by appropriate securing means 61. The free end 63 of the bimetallic element 6 may be adjustably secured as by nuts 62 threaded on the lower end of the stem of the valve 7 whereby any preselected temperature will cause the bimetallic element 6 to swing its free end upwardly to open the valve 7, and permit vapor from the boiler to escape through the passage 70 which the valve 7 closes when the bimetallic element 6 cools and pulls it downwardly. The valve 8 may be urged against its seat at the upper end of the passage 80, which it controls, by the spring 81 disposed within the closed fluid tight bellows 9; the spring being adjustably compressed by adjustable positioning of the nut 82 on the threaded shank of the mushroom bolt 83 and reacting against the retaining bracket 84.

Before discussing at greater length the particulars and the particular embodiments of my invention and the various constituents thereof the general method embodying my invention and the general mode of operation of my actuator viewed as a mechanism, may be summarized:

I provide a continuous heat input to the liquid near its surface in the heat insulated boiler part of my closed pressure system, continuously generate vapor and potential fluid pressure, and, by varying the flow of vapor from the boiler, and coincidentally removing the heat and latent heat thereof, i.e. by controlling the variable outflow of heat from my system, the pressure and volume of the fluid therein is controlled and made available for useful work. Within the steps of varying, throttling and controlling the outflow of vapor and vapor bubbles from the boiler I feed back a function of the work done to proportion the signal to the work and thus, inter alia, there will be no change of delivered force or motion except in response to a signal change. It is not without my teaching to depart as may be advantageous or desirable from the step of uniform and continuous heat input within the general plan of my method, particularly to the extent of providing a plurality of different ranges of rates of heat input that may be selected from time to time or provided to correspond automatically with different ranges of work, force or motion desired at different times from my actuator. For example, if a controlled valve required but a small fraction of its motion during the night compared with that required of it during the day prudence would suggest and my method would accommodate a lesser continuous heat input for the light load period than for the heavy load period. A load actuated switch to change a plurality of heating elements from parallel to series will illustrate the point.

In all events, I prefer that the heat be given to the liquid closely adjacent its surface within the insulated boiler as by a floating heater so that the least practicable minimum of liquid is heated or required to be heated per unit of vapor generated whereby the generation of vapor from the liquid is most efficiently provided consistent with the greatest segregation between the hot and cold parts of the fluid in the whole pressure system.

The work of the boiler and heater is to generate vapor and pressure in a confined, heat-insulated and heat-segregated place, maintaining as far as practicable substantially all the heat put into the ssytem in the vapor portion of the fluid within the boiler. The condenser has the opposite burden: that of ridding all the rest of the system of heat as quickly as practicable, and keeping the same substantially at or near ambient temperature. In aid of these functions the walls of the boiler and of the vessel are desirable formed of material having low specific heat consistent with necessary strength. The wall of the vessel should favor good heat conductivity in the condenser part thereof. The wall of the boiler favors as little heat conductivity as possible. It is of noticeable advantage in the operation of my invention that the walls of the boiler are exposed to the same fluid pressure inside and out, and therefore, unlike conventional boiler walls, do not require strength as pressure vessels but may be constructed of heat insulating, heat reflecting, fluid impervious material with predominate consideration given to their desired thermal properties.

By disposing the coil C, magnet M, lever L, fulcrum K and feedback hook-up G all within the vessel V, and, as I prefer, immersing all of the same in liquid of the fluid F, I solve and/or avoid the problems and awkwardness of transmitting mechanical signal motions between the exterior and interior of the pressure vessel and I also lubricate the mechanically moving parts and cool the coil C and electrical leads and have some electrical insulation, as I prefer, consistent with the desired electrical and dielectrical qualities of the fluid F.

An increase in pressure in the vessel V following a signal change which urges the coil C downwardly forces the piston P downwardly as viewed in FIG. 1, and moves the lower end of the feedback connection G downwardly with the piston and exerts a proportional force on the lever L tending to balance the force exerted by the coil thereon and to open the heat release valve to tend to reduce, or stop and increase in, the pressure in the vessel. As suggested in FIG. 1, the upper connection between the feedback G and the lever L may be adjusted, or selectably chosen, relative to the fulcrum K as at the points 1, 2 and 3 to selectively relate the stroke of the piston to the "stroke" of the coil; a thing which will modify the force gain of the whole instrument.

The operation of my invention has some aspects analogous to the operation of a vacuum tube amplifier: the small amount of energy needed to operate my heat release valve being likened to the small amount of energy required to drive the grid, and the heater in my actuator providing a flow of vapor controlled by my heat release valve in a way comparable with the grid control of the heat induced or aided flow of electrons in the tube.

I prefer and have found it practicable to operate my actuator with the fluids mentioned above at a maximum heater temperature of about 350° F. For example, with my preferrred fluid that boils at atmospheric pressure around 250° F. and has almost negligible liquid expansion, there may be substantially no working pressure at that temperature. Therefore, my actuator may return the piston P to its uppermost starting or "seated" position, nuts N engaging bar B, for example, by the spring S even with a liquid temperature as high as about 240° F. In passing, it may be noted that I prefer in this example that ambient temperature not exceed about 160° F., and that the liquid temperature in the condenser part of the vessel not exceed about 240° F., permitting about an 80° F. drop in the condenser for a convenient maximum throw off of heat from the condenser to ambient air. I prefer to provide a safety thermostat, not shown, to cut off the power input to the heater and the boiler if the fluid temperature in the condenser should exceed abou 240° F. Again assuming the spring S to then exert 300 pounds upwardly, as above, and have a rate of 180 pounds per inch and assuming an effective diaphragm area of about 22 square inches and a desired piston stroke from upper to lower "seated" position of about 1½ inches, the following operation proceeds:

At about 295° F. the fluid pressure will rise to about one atmosphere, above atmospheric pressure, and exert about 308 pounds on the piston to initiate its motion against the spring. At about 325° F. the fluid pressure will rise to about 26 p.s.i.g., and exert about 572 pounds on the piston and move it about one inch. At about 350° F. the fluid pressure will rise to about 40 p.s.i.g. and exert about 880 pounds on the piston sufficient to move it 1½ inches and have a few hundred pounds left over, such as to hold the valve in an extreme or seated position with a wide margin of safety and assurance. That is to say, the spring would afford a 300 pound "seating" or surplus force at one end of the piston travel in one direction and the fluid pressure produced at 350° F. would produce a like "seating" or surplus force at the other end of the piston travel in the other direction.

In terms of the forces developed in the piston rod, such as between the nuts N and the head of the piston P, and useful for upper "seating" as aforesaid, there would be a force change in the above example from (a) approximately 300 pounds tension in the piston rod due to the spring pressure exerted in said one direction at one end of the piston travel to (b) approximately 300 pounds compression due to the fluid pressure as indicated above, produced at 350° F. and exerted in said other direction at the other end of the piston travel, with the valve 5 in its closed or lower "seated" position, that is, a total useful external force change of approximately 600 pounds, approximately 300 pounds of which are utilized in compressing the spring S and moving the piston rod and valve to its lower "seated" position, and approximately 300 pounds of which are applied to the valve in this position to forcefully press it on its seat. This external force of course is in addition to approximately 300 pounds developed within the vessel to balance the pressure of the spring S before any movement of the piston rod takes place.

The rate of piston motion depends, inter alia, upon the rate of heat input and/or the rate of steaming familiar in steam boiler practice. Within the examples given herein I reckon it requires 2.94 B.t.u. to bring the vapor temperature up to 350° F. and the pressure up to 40 p.s.i.g. as aforesaid, so that a power input of 500 watts, i.e., .474 B.t.u. per second would give a 1½ inch stroke of the piston in 6.2 seconds, or at the rate of 4.1 seconds per inch of working piston travel.

Figure 3:
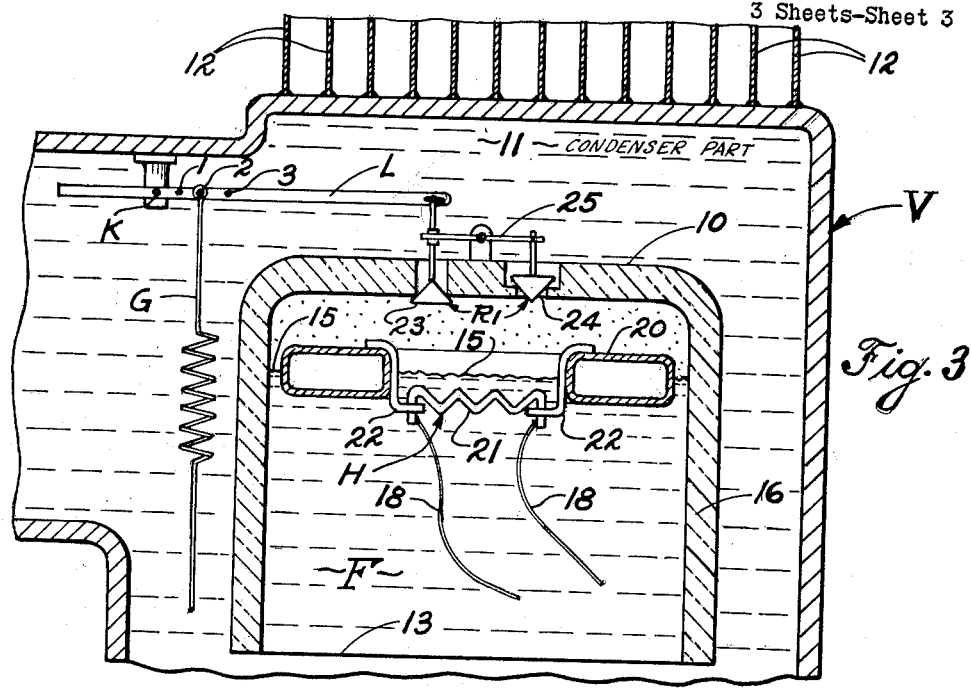
FIGURE 3 is a fragmentary, partly diagrammatic, vertical, longitudinal, sectional view similar to the view of FIGURE 1 illustrating a modified form with a different heat release valve mechanism and showing a specifically preferred form of floating heater in my actuator.

Referring now more particularly to FIG. 3, a form of heater that I prefer may comprise a float 20 carrying a heating element 21 by insulating supporting brackets 22, just below and closely adjacent the liquid level 15; the leads 18 being connected to the opposite ends of the element 21 and supplying power thereto. The element 21 preferably comprises a thin strip of stainless steel of form and size suitable to deliver the desired power at a temperature but little higher than the maximum vapor temperature desired; it being desirable to avoid cracking the fluid or effecting any deleterious change therein by overheating. The disposition of the heating element at the place of evaporation and agitation of the liquid puts the heat to its best, quickest and efficient use and conversely "cools" the element usefully. With constant heat input, as I prefer, and with variable rates of steaming at different pressures and temperatures in the normal operation of my actuator, my heating element tends to get but little hotter than the vapor at any normal vapor temperature throughout the range of such temperatures.

In FIGURE 3, I also suggest rather diagrammatically, a balanced heat release valve $R_1$ comprising for illustration oppositely moving and oppositely seating, equally acting closure elements 23 and 24 carried at opposite ends of a lever 25 pivotally supported on a fixed fulcrum in its middle and appropriately connected to and swung by the lever L, above described, whereby to move both closure members in substantially the same response to the current in the coil C, FIG. 1, as the valve R is tended to be moved. With balanced valves, the static head tending to close the valve R will be neutralized in the valve $R_1$.

Figure 4:
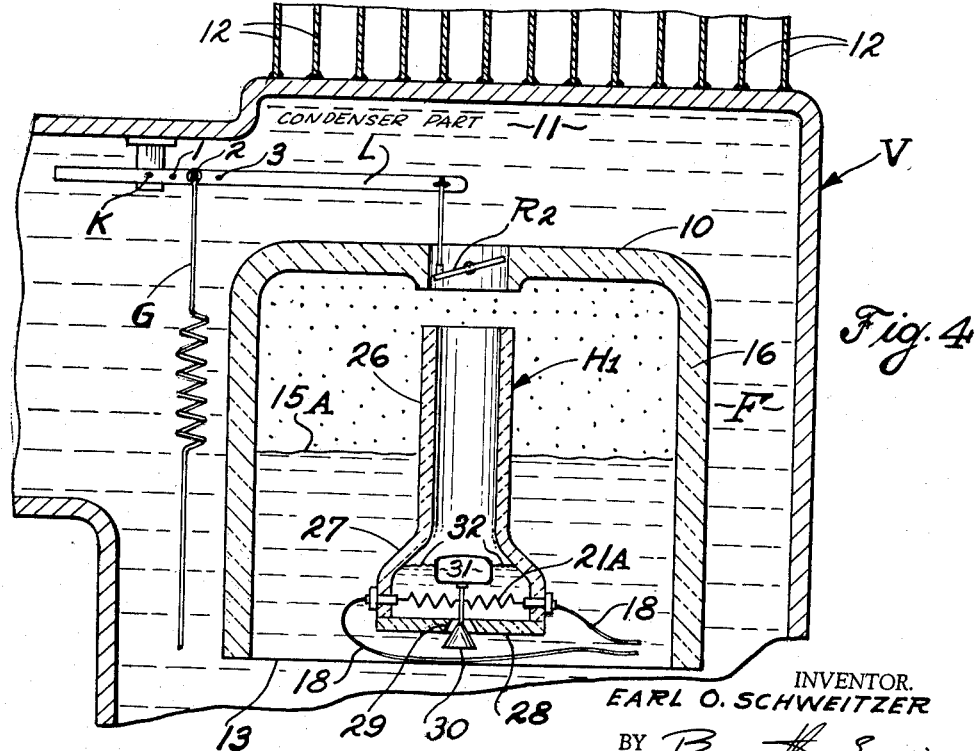
FIGURE 4 is a view similar to FIGURE 3 illustrating modified and specifically different forms of heat release valve and heater in an actuator embodying my invention.

In FIGURE 4, a butterfly valve $R_2$, actuated by the lever L, coil C, etc. as described above, is suggested as an alternative way of neutralizing the static head that tends to increase the work required to throttle the flow of vapor from the boiler to the condenser by an unbalanced valve.

In FIGURE 4, there is also illustrated an alternate form of heater, $H_1$ for boiling the fluid F in the boiler 10. In this form of heater I also provide that a minimum of liquid be heated, without, however, floating the heater as in my presently preferred form, FIGS. 1 and 3, described above. The heater $H_1$ comprises a vertically disposed hollow tubular fluid impervious part 26 with an enlarged bell-shaped bottom part 27 disposed in the middle of the boiler 10 and extending from a point near the heat release valve down to or a little below the bottom level of the boiler. The heater $H_1$ may be otherwise proportioned relative to the boiler about as shown. The walls of the heater are preferably heat insulating like those of the boiler 10. The heater is open at its top permitting the free up-flow and out-flow of vapor therefrom and has an apertured closure 28 for its bottom; the flow through the opening 29 thereof being controlled by the valve 30 which has a stem connected to and is actuated by the float 31. A heating element 21A corresponding to the element 21 above is fixedly secured in and within the bottom of the heater, is energized by electrical leads 18 and is apertured to permit the free motion of the stem of the valve 30 therethrough as influenced by the float 31.

In the operation of my actuator with the heater of FIG. 4, the float actuated valve 30 maintains a liquid level 32 just a little above and awash the heating element 21A in much the same way that the element 21 is related to the liquid level 15 as illustrated in FIG. 3 and described above, and for substantially the same purpose and with similar advantages. When power is delivered to the element 21A (assuming the heater, boiler and vessel V all full of cold liquid F and the hole 29 closed by the valve 30, as not specifically shown) liquid in the heater is boiled and fluid F in the vapor state flows up and out of the top of the heater and through the heat release valve $R_2$ if it is open. When the valve $R_2$ is closed or substantially restricting the outflow of vapor to create working pressure in the vessel, the vapor bubbles up within the heater and begins to distinguish a liquid level near the valve $R_2$ in the top of the boiler. Continued generation of vapor and restriction of its escape from the boiler depresses the boiler liquid level 15A downwardly outside the heater $H_1$ as temperature and pressure are increased. Immediately the liquid level in the boiler falls to the level of the top of the heater $H_1$ the liquid level 32 within the heater will tend to depart from the level 15A without the heater, and, variously as the valve $R_2$ may relieve the boiler of vapor, fall until the level in the heater lowers the float 31, opens the valve 30 and establishes the level 32, preferably just above the heating element 21A whereafter the only liquid in the system to be heated will be that closely adjacent the element 21A until the occasion when the outflow of vapor through the heat release valve may raise the liquid level 15A above the top of the heater and flood the heater from the top as when the signal in the coil C requires a minimum pressure in the vessel V.

In this form of heater I prefer to employ a constant heat input to the element 21A, and except for the periods when the heater may be flooded with liquid the operation and advantage will be like those above described that I have provided with my floating heater H. The upper tubular part of the heater $H_1$ need have no greater diameter than necessary to give free passage to the vapor generated at and by the element 21A. Thus the added volume of liquid contained in the heater when it is flooded may be small, and the boiling away thereof need not take long after a signal requiring increased pressure has closed the heat release valve. The nearer the top of the heater is brought to the top of the boiler and the quicker the liquid level 15A is forced below the top of the heater, the less liquid following a flood of the heater will lie above the heating element and be involved in vapor generation, as I prefer and have explained above. The enlarged bottom 27 of the heater $H_1$ on the other hand should, for my present preferred purpose, be of large enough diameter to accommodate the desired size of the heating element 21A in its extended proximity to the surface 32 of the liquid to effect the maximum desired rate of fluid evaporation. The depth of the whole bottom part 27 is preferably merely sufficient to accommodate the working parts contained therein and the free movement of fluid therein and therethrough. The position of the "bottom" of the bottom part 27 with the closure 28 and valve 30 in relation to the bottom of the boiler 10 will be determinable of whether or not vapor will ever have access to the bottom of the heater through the orifice 29. As a safety measure the bottom of the heater may be disposed above the bottom of the boiler so that an extreme condition of vapor generation and high pressure would lower the liquid level 15A below the heater (abnormally for present purposes) and admit only vapor to the heater and thus put an end to boiling and evaporation until a higher liquid level and normal operation is restored. Obversely the bottom of the heater may lie below the bottom of the boiler to militate against admission of vapor thereinto and/or for such structural or other convenience as may be had.

While I have illustrated and described a preferred and certain modified forms of my invention, and undertaken to teach the essential principles and the best ways of constructing, practicing and enjoying my invention, changes and improvements will occur to those skilled in the art, who come to know and appreciate my invention, without departing from the spirit and substance thereof. Wherefore, I do not care to be limited to the forms, practices and species herein specifically illustrated and described, nor in any other manner inconsistent with the promotion of the progress of the art which may be shown to be attributed to my invention.

I claim:

1. Mechanism for changing the fluid pressure in a vessel containing liquid, comprising a boiler in the vessel, said vessel comprising a condenser for changing vapor to liquid and disposed above the boiler, a heater for generating vapor in the boiler, a vapor release valve in an upper part of the boiler, means affording liquid communication between a lower part of the boiler and condenser, and means for changing the flow of vapor through said valve from the boiler to the condenser whereby to change the rate of condensation of vapor to liquid in said condenser and change the fluid pressure in the vessel.

2. The combination of claim 1 with means for inhibiting the flow of heat away from said boiler other than through said vapor release valve.

3. The combination of claim 2 with means responsive to changes of pressure in said vessel for feeding back effects thereof to said means for changing the flow of vapor through said valve from the boiler to the condenser.

4. The combination of claim 3 with means for maintaining said heater below and closely adjacent the surface of the liquid from which said vapor is generated.

5. The combination of claim 4 in which said heater comprises an electrical heating element buoyantly supported below and adjacent the surface of the liquid in the boiler.

6. The combination of claim 1 with means for maintaining said heater below and closely adjacent the surface of liquid from which said vapor is generated.

7. The combination of claim 1 with means responsive to changes in pressure in said vessel for feeding back a manifestation thereof to said last named means.

8. Apparatus for changing the fluid pressure in a closed heat fluid pressure system containing liquid comprising a boiler having an upper opening submerged in liquid within said system and having a lower opening in free liquid communication with liquid in said system, said system also comprising a condenser for changing vapor to liquid and containing liquid and disposed above the boiler and having fluid communication through said system with said boiler openings, a vapor generator in the boiler, a vapor release valve for the said upper opening of the boiler, and means for actuating said valve to change the flow of vapor from the boiler to the condenser whereby to change the rate of condensation in said condenser and change the pressure in the system.

9. The apparatus of claim 8 wherein the means for actuating the vapor release valve comprises a movable electrical element responsive to small electrical signals and operatively connected to said valve.

10. The apparatus of claim 9 wherein the connection between said element and said valve is biased by means responsive to the pressure in said system.

11. The apparatus of claim 10 wherein said valve is balanced to neutralize static head across said upper opening.

12. Apparatus according to claim 8 with means inhibiting the flow of heat from said boiler to said condenser other than by the said flow of vapor.

13. Apparatus according to claim 8 with external heat radiating means for taking heat from said condenser and away from said system.

14. Apparatus according to claim 8 with movable means responsive to changes in pressure in the system for transmitting force and motion therefrom.

15. Apparatus according to claim 8 with means for maintaining said vapor generator below and adjacent the surface of liquid from which vapor is generated.

16. Apparatus according to claim 8 with means responsive to excessive fluid pressure in the system for releasing vapor from said boiler.

17. Apparatus according to claim 8 with means responsive to excessive temperature in the system for releasing vapor from said boiler.

18. An expansible heat fluid motor containing a heat-vaporizable liquid, comprising an element movable in response to the pressure of fluid in the motor, a heating part of said motor adapted to contain said fluid in both its liquid and vapor states in lower and upper portions thereof respectively, a cooling part of said motor communicating with said portions respectively of said heating part containing said fluid in its liquid and vapor states, means for heating fluid in said heating part tending to induce vapor to flow to said cooling part, means for cooling vapor to liquid in said cooling part, means for inhibiting the flow of heat apart from flowing vapor from said heating part to said cooling part, and means for controlling the flow of vapor from said heating part to said cooling part whereby to change the rate of changing vapor to liquid in the motor and change the pressure in and expansion of said motor.

19. The motor of claim 18 with means responsive to the said change in expansion of said motor for feeding back the effects thereof to said last named means.

20. An electrically controlled fluid motor having a movable element capable of exerting great force and motion in response to minute electrical signals comprising a fluid filling the motor which has a liquid phase at and below ambient temperatures affecting the motor and has a vapor phase above such temperatures, a boiler disposed within the motor and immersed in liquid in the motor and having insulating walls and having an internal heater for generating vapor and having a closed vapor space for generated vapor above the liquid level in the boiler and having an opening below said liquid level affording free liquid communication with the liquid in the motor, said motor also comprising a condenser for condensing vapor and removing heat from said motor disposed above said boiler and in which the liquid contained in said motor moves freely, fluid conducting means extending from the said vapor space of said boiler to said condenser and through which vapor tends to flow by gravity from said boiler to said condenser, valve means in said fluid conducting means responsive to said signals independently of the fluid pressure in the motor for throttling the flow of vapor from said boiler to said condenser whereby to change the rate of condensation of vapor and change the fluid pressure in said motor and move said element.

21. The motor of claim 20 with a yielding feedback connection between said last named means and said movable element.

References Cited in the file of this patent

UNITED STATES PATENTS

| | | |
|---|---|---|
| 1,883,124 | Trede et al. | Oct. 18, 1932 |
| 1,983,314 | Schultz | Dec. 4, 1934 |
| 2,548,708 | Dickey | Apr. 10, 1951 |
| 2,867,974 | Wenander | Jan. 13, 1959 |
| 2,932,287 | Goetz | Apr. 12, 1960 |

Disclaimer 3,132,472.—*Earl O. Schweitzer*, Wickliffe, Ohio. THERMAL ACTUATOR.
Patent dated May 12, 1964. Disclaimer filed Dec. 30, 1965, by the assignee, *Crane Co.*

Hereby enters this disclaimer to the entire remaining term of said patent.
[*Official Gazette May 10, 1966.*]